United States Patent Office 3,356,748
Patented Dec. 5, 1967

3,356,748
SYNTHESIS OF FLUOROOLEFINS
FROM OLEFINS
Richard D. Cramer, Landenberg, Pa., and Frank N. Jones, Wilmington, Del., assignors to E. I. du Pont de Nemours and Company, Wilmington, Del., a corporation of Delaware
No Drawing. Filed Jan. 30, 1964, Ser. No. 341,427
16 Claims. (Cl. 260—653.3)

This invention relates to a process for preparing fluorinated olefins. More specifically, the invention concerns the preparation of terminally unsaturated monofluoroolefins by substitution of the corresponding olefin.

Heretofore, such olefinic fluorides, especially vinyl fluoride, have been prepared in various ways, often involving costly reactants and resulting in a mixture of products. For example, vinyl fluoride has been prepared by passing purified acetylene and hydrogen fluoride over a contact catalyst, as described in U.S. Patents 2,401,850; 2,437,148; 2,519,199 and others. Vinyl fluoride and isopropenyl fluoride have also been prepared by pyrolysis of 1,1-difluoroethane and 2,2-difluoropropane, respectively, at high temperatures. (See U.S. Patents 2,442,993 and 2,585,529.)

It is an object of the present invention to provide a new and improved method for preparing olefinic fluorides. Another object is to provide a method of preparing olefinic fluorides using an olefin as a reactant. Still another object is to provide such a process employing relatively low temperatures. A still further object is to provide a process for preparing vinyl fluoride from ethylene. These and other objects will become apparent hereinafter.

In the present invention, monofluorinated terminally unsaturated olefins of from 2 through 8 carbon atoms having the formula R—CF=CH$_2$ wherein R is hydrogen or lower alkyl are prepared by heating the corresponding non-fluorinated olefin with an alkali metal fluoride in the presence of palladous chloride in an aprotic reaction medium under substantially anhydrous conditions.

The terminally unsaturated olefin reactant has the formula R—CH=CH$_2$ where R is as defined above. Preferably, the olefin is a lower alkene, i.e., where R is hydrogen or alkyl of 1 to 4 carbon atoms; for example, ethylene, propylene, butylene or hexene. Because of availability and economic considerations, the most preferred lower alkene is ethylene, i.e., where R is hydrogen, which results in the product vinyl fluoride.

Of the alkali metal fluorides, it is preferable to use sodium, potassium or cesium fluoride. The latter has been found most advantageous.

The aprotic reaction medium is composed of one or more aprotic organic compounds selected from esters, ethers and aromatic nitro compounds which may contain ether or ester linkages. By aprotic is meant a compound which does not contain Zerewitinoff hydrogen.

The aromatic nitro compounds may be represented by the formula R'(NO$_2$)$_n$ where R' is an aromatic hydrocarbon, i.e., a carbocyclic aromatic group of 6 to 14 carbon atoms, preferably of 6 to 10 carbon atoms, and may be substituted with halo (chloro, bromo, or iodo), lower alkyl, lower alkyloxy, lower alkyloxycarbonyl or aryloxycarbonyl groups where aryl is preferably phenyl, n may be 1 or 2. Preferably R' is unsubstituted. Most preferably R' is phenyl or phenylene depending on whether n is 1 or 2. Specific examples of aromatic nitro compounds include nitrobenzene; α- and β-nitronaphthalene; 1-nitroanthracene; o-, m-, and p-nitrotoluene; m-dinitrobenzene; o-, m-, and p-nitrochlorobenzene; o-, m- and p-nitrobromobenzene; p-nitroanisole; p-nitrophenyl propyl ether; methyl m-nitrobenzoate, propyl m-nitrobenzoate; p-nitrophenyl benzoate and the like. Mixtures of the nitrated aromatic compounds may be employed. For reasons of availability, nitrobenzene is especially preferred.

The esters used as the reaction medium are those prepared from hydrocarbon-carboxylic acids or diacids and hydrocarbyl alcohols. They can be represented by the formula R"(COOR''')$_n$ where R" is a hydrocarbon group free of aliphatic unsaturation of 1 through 18 carbon atoms, R''' is alkyl of 1 through 18 carbon atoms, and n is 1 or 2. Thus R" can be a saturated open chain hydrocarbon in which the chain can be straight or branched, a saturated cyclic hydrocarbon or an aromatic hydrocarbon. Preferably R" is a lower alkane or benzene while R''' is lower alkyl. Most preferably R" is phenylene when n is 2. Specific ester examples include ethyl butyrate, propyl acetate, hexyl acetate, octadecyl acetate, dodecyl acetate, diethyl phthalate, dibutyl phthalate, and the like.

Ethers operable as the reaction medium are composed of an aliphatically saturated hydrocarbon chain of from 2 through 18 carbon atoms which is interrupted by 1 through 4 ethereal oxygens. Thus when only one ethereal oxygen is present, the ether will have the formula R"OR" wherein R" is defined as above and can be alkyl, cycloalkyl, aryl, alkaryl or aralkyl, as for example, methyl phenyl ether, didodecyl ether, ethyl octadecyl ether, dibutyl ether, methyl cyclohexyl ether, methyl tolyl ether, and the like. In addition, the two R" groups may be joined to form a cyclic ether such as tetrahydrofuran, dioxane, trioxane and the like. When two ethereal oxygens are present, the hydrocarbon chain will of course be divided into three components and the ether will have the formula R"—O—R"—O—R". The central R" component is bonded to two oxygens; and the two terminal components are bonded to a single oxygen atom, as for example, in ethylene glycol dimethyl ether. In a similar manner, ethers of 3 or 4 ethereal oxygens can be used, for example, diethylene glycol dimethyl ether and triethylene glycol dimethyl ether. As mentioned above, cyclic alkylene ethers are operable, for example, tetrahydrofuran, dioxane, trioxane, and the like. Preferably the ether is a cyclic ether and most preferably tetrahydrofuran.

Of the various media, the aromatic nitro compounds are preferred. In addition, the medium may be composed of more than one of the aprotic compounds.

The reaction is suitably conducted by heating the intimately mixed ingredients under substantially anhydrous conditions. Intimate mixing may be achieved, for example, by placing the ingredients in a shaker tube and vigorously shaking, or by employing a magnetic or mechanical stirrer.

The proportions of the ingredients in the reaction mixture are not critical, and stoichiometric amounts of each may be employed. It is preferable to use an excess of the reaction medium ingredient as it acts as a solvent or partial solvent. The mechanism of the reaction is not completely understood, but it is believed the palladous chloride first forms a loose complex with the reaction medium ingredient, and that the olefin replaces the medium in the complex.

The reaction time is not critical, for it may range from 1 hour up to 20 hours or more. Of course, when higher temperatures and/or pressures are used, the time may be reduced, e.g., to a few seconds.

The reaction may be carried out over a broad temperature range which will be limited by the boiling point of the reaction medium. It has been found, and is included as a part of this invention, that the addition to the reaction mixture of an organic nitrile enables the reaction to take place within a temperature range of from about 40° C. to about 300° C., and preferably 80° C. to 200° C. Without the nitrile, the reaction will take place over a range of from about 120° C. to 350° C., and preferably 150° C. to 225° C. The nitrile can be represented by the formula R'ᵛCN wherein R'ᵛ is hydrocarbyl free of aliphatic unsaturation of up to 18 carbon atoms. Preferably R'ᵛ is lower alkyl, lower alkaryl, or aryl. Most preferably R'ᵛ is phenyl. Specific examples of the nitrile include benzonitrile, pivalonitrile, acetonitrile, p-toluonitrile, β-naphthonitrile, dodecyl cyanide, and the like. Preferably, the amount of the nitrile used should not exceed a ratio of 2 moles of nitrile per mole of palladous chloride.

Pressure is not critical and may vary from subatmospheric to superatmospheric. For convenience, the process may be carried out at about atmospheric pressure. The pressure, of course, will vary if the olefin is introduced into a closed container. However, the process may be carried out by bubbling the olefin into the intimately mixed reaction mixture and removing the gaseous products. When the pressure varies from atmospheric pressure, the temperature ranges will be extended accordingly.

In an alternative procedure, the olefin and alkali metal fluoride may be intimately mixed with either a preformed complex of $(R'^vCN)_2PdCl_2$ or, preferably with said complex and excess palladous chloride in the reaction medium. In this alternate procedure the reaction is preferably carried out between 15° and 50° C., although temperatures from 0° to 300° C. may be employed.

Still another alternative is to add a preformed complex of μ-dichloro - 1,2 - dichloro-1,2-diethylenedipalladium (II) to a mixture of the alkali metal fluoride, palladous chloride, nitrile and reaction medium. The reaction may be carried at the same temperatures as for the previous alternative.

The preformed complexes in the two preceding paragraphs may be prepared as described in J. Am. Chem. Soc. 60, 882 (1938). In both foregoing alternatives, the system should, preferably, not contain more than 2 moles of R''CN for each total mole of $PdCl_2$ present.

One of the products of the reaction and its alternatives is metallic palladium which can be collected, reconverted by standard procedures to palladous chloride and re-used.

The fluorinated olefin can be isolated by ordinary procedures such as fractional distillation, absorption methods, such as gas chromatography, or by cooling the gaseous mixture to condense the fluorinated olefin.

The examples which follow illustrate the method of conducting the process of the invention. Quantities are expressed as parts by weight, unless otherwise stated.

*Example 1*

In the glass reaction vessel having a mercury manometer attached, the total volume being about 275 parts of water, was placed 1.5 parts of palladous chloride, one part of cesium fluoride and 8 ml. of anhydrous nitrobenzene. The pressure was reduced to about 1 mm. of mercury and sufficient ethylene was admitted to bring the pressure to 550 mm. of mercury. The reaction mixture was vigorously stirred with a "Teflon" clad magnetic stirrer and heated to 190° for 20 hrs. When the system was cooled to room temperature, the pressure was 501 mm. The gaseous products were distilled into a gas cylinder. Analysis of a sample of the product by gas chromatography showed that it contained 60 parts of ethylene (by volume), 14.6 parts of vinyl fluoride, and 23 parts of carbon dioxide. Infrared analysis showed ethylene and vinyl fluoride to be present in the approximate ratio 89:11 by volume.

In a similar experiment in which the reaction was heated at 185° for 3 hours, infrared analysis showed ethylene and vinyl fluoride to be present in the gaseous product in the ratio 94:6 by volume.

When the reaction was heated at about 150° for 20 hours, infrared analysis showed ethylene and vinyl fluoride to be present in the gaseous product in the ratio 84:16 by volume.

*Example 2*

In a reaction vessel like the one described in Example 1 was placed 1 part of palladous chloride, 1 part of cesium fluoride and 9 parts of anhydrous di-n-butyl phthalate. The pressure was reduced to about 1 mm. of mercury and sufficient ethylene admitted to bring the pressure to 500 mm. of mercury. The liquids and solids were vigorously stirred with a "Teflon" clad magnetic stirring bar and rapidly heated to 240°; the temperature was then reduced to 200° and heating and stirring at 200–205° was continued for 6 hours. The gaseous products were condensed into a small gas cylinder which was immersed in liquid nitrogen. Infrared analysis showed ethylene and vinyl fluoride to be present in the approximate ratio 97:3 by volume.

*Example 3*

In a reaction vessel like the one described in Example 1 was placed 1.25 parts of palladous chloride, 1.5 parts of cesium fluoride and 8 parts of anhydrous nitrobenzene. The vessel was evacuated to a pressure of about 1 mm. of mercury, and enough propene admitted to bring the pressure to 507 mm. of mercury. The mixture was vigorously stirred with a "Teflon" clad magnetic stirring bar and heated at 195–205° for 18 hours. The gaseous products were distilled into a small gas cylinder, and separation by gas chromatography showed the products were propene, 58%; carbon dioxide, 32%; fluoropropene, 5%; difluoropropane, 3%; and 2% unidentified substances. The chromatogram indicated the fluoropropene fraction was primarily 2-fluoropropene, contaminated with a small amount of 1-fluoropropene. Analysis by mass spectrometry and infrared spectroscopy, which had strong peaks at 5.92, 7.84, 7.94 and 11.85μ, confirmed the presence of 2-fluoropropene.

*Example 4*

In a reaction vessel like the one in Example 1 was placed 1 part of palladous chloride, 0.25 part of benzonitrile, 1 part of cesium fluoride, 8 parts of nitrobenzene and a "Teflon" clad magnetic stirring bar. The pressure was reduced to about 1 mm. of mercury and sufficient ethylene was admitted to bring the pressure to 500 mm. at room temperature. The vessel was sealed and the part containing the liquids and solids was heated at 95–100° and vigorously stirred with a magnetic stirring bar for 21 hours. As the reaction mixture was heated, the pressure rose to 540 mm.; after 21 hrs. the pressure was 503 mm. The gaseous contents of the reaction vessel were condensed into a small gas cylinder which was immersed in liquid nitrogen. Analysis of a sample of the gases by gas chromatography showed that they consisted of 80 parts of ethylene, 12 parts of vinyl fluoride, 2 parts of air, and 6 parts of an unidentified substance. Infrared analysis showed that ethylene and vinyl fluoride were present in the approximate ratio 88:12 by volume.

*Example 5*

In a thick-walled glass ampoule having a capacity of about 55 parts of water was placed about 0.5 part of palladous chloride, 1 part of bis(benzonitrile)dichloropalladium(II), 1 part of cesium fluoride and 8.9 parts (10 parts by vol.) of anhydrous tetrahydrofuran. The ampoule was immersed in liquid nitrogen and evacuated to a pressure of about 0.5 mm. Ethylene (50 parts by volume at atmospheric pressure and 25° C.) was distilled into the ampoule. The ampoule was sealed and vigorously shaken for 22 hours at 20–25° C. Infrared analysis of the mixture of gases in the ampoule showed that, in addition to tetrahydrofuran vapor, ethylene and vinyl fluoride were present in the approximate ratio 86:14 by volume.

When bis(acetonitrile)dichloropalladium(II) or bis-(pivalonitrile)dichloropalladium(II) was substituted for bis(benzonitrile)dichloropalladium(II) in the above procedure, the product gases were found to contain ethylene and vinyl fluoride in a 97:3 ratio by volume.

The bis(acetonitrile)- and bis(pivalonitrile)dichloropalladium(II) complexes were prepared by refluxing a mixture of palladous chloride and an excess of the appropriate nitrile overnight. The resulting solutions were filtered while hot and the nitrile complexes crystallized on cooling.

Bis(acetonitrile)dichloropalladium(II)

*Analysis.*—Calcd. for $C_4H_6Cl_2N_2Pd$: C, 18.52; H, 2.28; N, 10.80. Found: C, 19.21; H, 2.46; N, 10.79.

Bis(pivalonitrile)dichloropalladium(II)

*Analysis.*—Calcd. for $C_{10}H_{18}Cl_2N_2Pd$: C, 34.96; H, 5.28; N, 8.16. Found: C, 35.26; H, 5.41; N, 8.28.

Example 6

In an ampoule like the one described in Example 5 was placed 0.5 part of bis(benzonitrile)dichloropalladium(II), 0.5 part of palladous chloride, one part of cesium fluoride, and 8 parts of nitrobenzene. The tube was immersed in liquid nitrogen and evacuated; ethylene (95 parts by volume at atmospheric pressure and 25° C.) was distilled into the ampoule. The ampoule was sealed and vigorously shaken for 18 hours while immersed in a hot water bath at 90° C. The gaseous products were condensed into a small gas cylinder. By gas chromatography and mass spectrography, the products were found to be 35% ethylene, 3% vinyl fluoride, 60% a mixture of butenes, fluorobutenes and a compound of the formula $C_4H_5F$, and 2% unidentified substances. The sample also contained carbon dioxide.

Example 7

In an ampoule like the one described in Example 5 was placed 0.5 part of bis(benzonitrile)dichloropalladium(II), 0.5 part of palladous chloride, one part of cesium fluoride, and 8 parts of ethylene glycol dimethyl ether. The ampoule was immersed in liquid nitrogen, evacuated, and ethylene (95 parts by volume at atmospheric pressure and 25° C.) was distilled into the ampoule. The ampoule was sealed and shaken for 22 hours at 20–25° C. It was found by infrared analysis to contain 91 parts of gas which contained ethylene and vinyl fluoride in the approximate ratio 90:10 by volume.

In an essentially identical experiment in which diethylene glycol dimethyl ether was substituted for ethylene glycol dimethyl ether, the product gas was found to contain ethylene and vinyl fluoride in a 97:3 ratio by volume.

Example 8

A polyethylene tube ⅜" d. x 12" long was charged with 0.5 part of anhydrous cesium fluoride, 6 parts anhydrous nitrobenzene containing a trace of benzonitrile and 0.5 part of μ-dichloro-1,2-dichloro-1,2-diethylenedipalladium(II) prepared by the method described by M. S. Kharasch et al. [J. Am. Chem. Soc., 60,882 (1938)]. The tube was chilled to about −80° C., evacuated and sealed. The reaction proceeded at 25° for 3 days as the mixture was agitated by slowly rotating the tube end-over-end. The gas over the reaction mixture had an infrared absorption pattern corresponding to a mixture of vinyl fluoride and ethylene. The intensity of absorption of the 6.0–6.1 doublet corresponds to the conversion of about 8% of the ethylene in μ-dichloro-1,2-dichloro-1,2-diethylenedipalladium(II) to vinyl fluoride.

When 0.5 part of anhydrous cesium fluoride, 8 parts anhydrous nitrobenzene, 0.1 part benzonitrile, and 0.75 part of μ-dichloro-1,2-dichloro-1,2-diethylenedipalladium(II) were used as above except that the reaction time was 48 hours instead of 72 hours, the gas recovered was shown by i.r. absorption and mass spectroscopic analysis to correspond to 4% conversion to vinyl fluoride.

Example 9

In an experiment essentially identical to the one described in Example 5 except that potassium fluoride was substituted for cesium fluoride, there was obtained a gaseous product containing ethylene and vinyl fluoride in the ratio 98.5:1.5 by volume.

Example 10

In an experiment essentially identical to the one described in Example 1 except that sodium fluoride was substituted for cesium fluoride, the infrared spectrum of the product indicated that a trace of vinyl fluoride was present. The presence of vinyl fluoride was confirmed by mass spectrometry, which indicated 0.4% of vinyl fluoride to be present. Also shown to be present were ethylene, silicon tetrafluoride, carbon dioxide and 1–1.5% of vinyl chloride. The presence of traces of butene-1, butane and propene were also indicated.

The reaction ingredients may be obtained commercially and used as obtained. It is preferable however to dry the reaction medium compound by any usual procedure, for example, by heating and distilling or drying in a molecular sieve.

The fluorine-containing olefins prepared by the process of this invention are especially useful as monomers for polymer formation. For example, polyvinyl fluoride and polyisopropenyl fluoride are prepared from vinyl fluoride and isopropenyl fluoride, respectively (see U.S. Patents 2,419,008–10, and 2,585,529), and find application as films, plastics, and in coating compositions and adhesives.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing fluorinated terminally unsaturated olefins containing from 2 to 8 carbon atoms, inclusive, wherein the fluorine is substituted on olefinic carbon which comprises heating an intimately mixed mixture comprising:
   (1) an alkali metal fluoride;
   (2) a terminally unsaturated olefin of from 2 to 8 carbon atoms, inclusive;
   (3) palladous chloride; and
   (4) an aprotic reaction medium comprising a compound of the class consisting of:
      (a) $R'(NO_2)_n$ wherein $n$ is a cardinal number of from 1 to 2, inclusive, and $R'$ is an aromatic hydrocarbon group of from 6 to 14 carbon atoms which can be substituted with a group of the class consisting of halo, lower alkyl, lower alkyloxy, lower alkoxycarbonyl, and aryloxycarbonyl;
      (b) $R''(COOR''')_n$ wherein $n$ is a cardinal number of from 1 to 2, inclusive, $R''$ is a hydrocarbon group free of aliphatic unsaturation of from 1 through 18 carbon atoms, and $R'''$ is alkyl of 1 through 18 carbon atoms;
      (c) ethers consisting of an aliphatically saturated hydrocarbon of from 2 through 18 carbon atoms interrupted by 1 to 4 ethereal oxygens, inclusive; and
      (d) mixtures thereof,
under substantially anhydrous conditions.

2. The process of claim 1 carried out at temperatures of from about 120° to about 350° C.

3. The process of claim 2 wherein the reaction medium is nitrobenzene.

4. The process of claim 2 wherein the alkali metal fluoride is cesium fluoride.

5. The process of claim 2 wherein the olefin is ethylene.

6. The process of claim 1 in which the reaction mixture contains a nitrile of the formula $R'^vCN$ wherein $R'^v$ is hydrocarbyl free of aliphatic unsaturation of up to 18 carbon atoms, said nitrile present in an amount not more than a 2:1 mole ratio of nitrile to palladous chloride.

7. The process of claim 6 carried out at a temperature of from about 40° C. to about 300° C.

8. The process of claim 7 wherein the reaction medium it tetrahydrofuran.

9. The process of claim 7 wherein the reaction medium is nitrobenzene.

10. The process of claim 7 wherein the alkali metal fluoride is cesium fluoride.

11. A process for preparing vinyl fluoride which comprises heating ethylene, palladous chloride, cesium fluoride and nitrobenzene at a temperature of from about 120° C. to about 350° C.

12. A process for preparing vinyl fluoride which comprises heating ethylene, palladous chloride, cesium fluoride, nitrobenzene and benzonitrile at a temperature of from about 40° to about 300° C., said benzonitrile present in an amount not more than a 2:1 mole ratio of nitrile to palladous chloride.

13. The process of claim 12 wherein the temperature is from about 80° to about 200° C.

14. A process for preparing fluorinated olefins which comprises reacting a terminally unsaturated olefin of from 2 to 8 carbon atoms, inclusive, an alkali metal fluoride and a complex of the formula $(R'^vCN)_2PdCl_2$ wherein $R'^v$ is hydrocarbyl free of aliphatic unsaturation of up to 18 carbon atoms, in an aprotic reaction medium selected from the class consisting of:

(a) $R'(NO_2)_n$ wherein $n$ is a cardinal number of from 1 to 2, inclusive, and $R'$ is an aromatic hydrocarbon group of from 6 to 14 carbon atoms which can be substituted with a group of the class consisting of halo, lower alkyl, lower alkyloxy, lower alkyloxycarbonyl, and aryloxycarbonyl;

(b) $R''(COOR''')_n$ wherein $n$ is a cardinal number of from 1 to 2, inclusive, $R''$ is a hydrocarbon group free of aliphatic unsaturation of from 1 through 18 carbon atoms, and $R'''$ is alkyl of 1 through 18 carbon atoms;

(c) ethers consisting of an aliphatically saturated hydrocarbon of from 2 through 18 carbon atoms interrupted by 1 to 4 ethereal oxygens, inclusive; and (d) mixtures thereof, under substantially anhydrous conditions.

15. The process of claim 14 in which palladous chloride is present as an additional ingredient.

16. A process for preparing fluorinated olefins which comprises reacting an alkali metal fluoride, palladous chloride, $R'^vCN$ wherein $R'^v$ is hydrocarbyl free of aliphatic unsaturation of up to 18 carbon atoms, and a complex of bis - (ethylene) - dichloro-$\mu$-dichlorodipalladium(II) in an aprotic reaction medium selected from the class consisting of:

(a) $R'(NO_2)_n$ wherein $n$ is a cardinal number of from 1 to 2, inclusive, and $R'$ is an aromatic hydrocarbon group of from 6 to 14 carbon atoms which can be substituted with a group of the class consisting of halo, lower alkyl, lower alkyloxy, lower alkyloxycarbonyl, and aryloxycarbonyl;

(b) $R''(COOR''')_n$ wherein $n$ is a cardinal number of from 1 to 2, inclusive, $R''$ is a hydrocarbon group free of aliphatic unsaturation of from 1 through 18 carbon atoms, and $R'''$ is alkyl of 1 through 18 carbon atoms;

(c) ethers consisting of an aliphatically saturated hydrocarbon of from 2 through 18 carbon atoms interrupted by 1 to 4 ethereal oxygens, inclusive; and (d) mixtures thereof, under substantially anhydrous conditions, the amount of $R'^vCN$ present being no more than a 2:1 mole ratio of $R'^vCN$ to the total palladous chloride present.

References Cited

UNITED STATES PATENTS 3,000,979  9/1961  Gibbs _____ 260—653.3
3,024,290  3/1962  Henne _____ 260—653.3

DANIEL D. HORWITZ, *Primary Examiner.*